No. 741,502. PATENTED OCT. 13, 1903.
R. W. JONES.
FEED WATER HEATER AND PURIFIER.
APPLICATION FILED OCT. 30, 1902.
NO MODEL.

Witnesses
E. L. Reichenbach
J. R. Wilson

Inventor
R. W. Jones
By H. R. Wilson
Attorney

THE NORRIS PETERS CO., PHOTO-LITHO., WASHINGTON, D. C.

No. 741,502.  
Patented October 13, 1903.

UNITED STATES PATENT OFFICE.

ROBERT WILLIAM JONES, OF LONDON, OHIO, ASSIGNOR OF ONE-FOURTH TO WM. T. S. REA, OF LONDON, OHIO.

FEED-WATER HEATER AND PURIFIER.

SPECIFICATION forming part of Letters Patent No. 741,502, dated October 13, 1903.

Application filed October 30, 1902. Serial No. 129,473. (No model.)

*To all whom it may concern:*

Be it known that I, ROBERT WILLIAM JONES, a citizen of the United States, residing at London, in the county of Madison and State of Ohio, have invented certain new and useful Improvements in Feed-Water Heaters and Purifiers; and I do declare the following to be a full, clear, and exact description of the invention, such as will enable others skilled in the art to which it appertains to make and use the same.

My invention is an improved feed-water heater and purifier of that class known as "open-exhaust" heaters, in which the feed-water for the boiler is heated by direct exposure to exhaust-steam from an engine; and it consists in the peculiar construction and combination of devices hereinafter fully described and claimed.

The object of my invention is to provide a simple and compact feed-water heater of this class which is efficient in employing exhaust-steam from an engine for heating feed-water prior to its introduction into the boiler, in removing lime, magnesium, and other deleterious substances from the water, and also in filtering the same, so that it is purified while being heated for use in the boiler.

Figure 1:
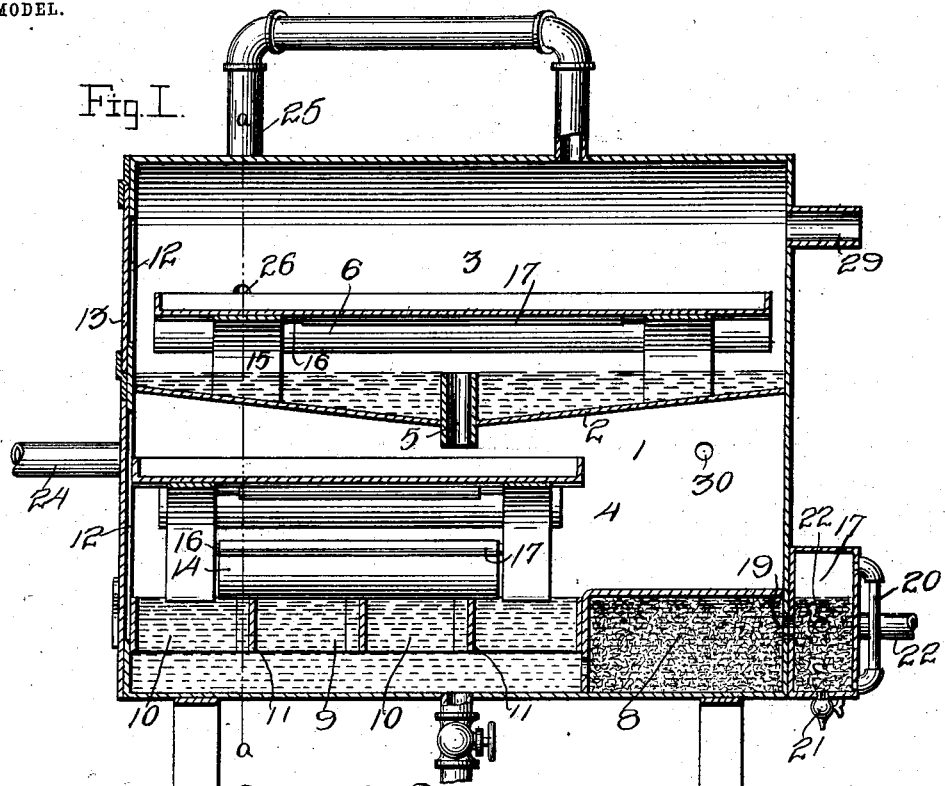
Figure 2:
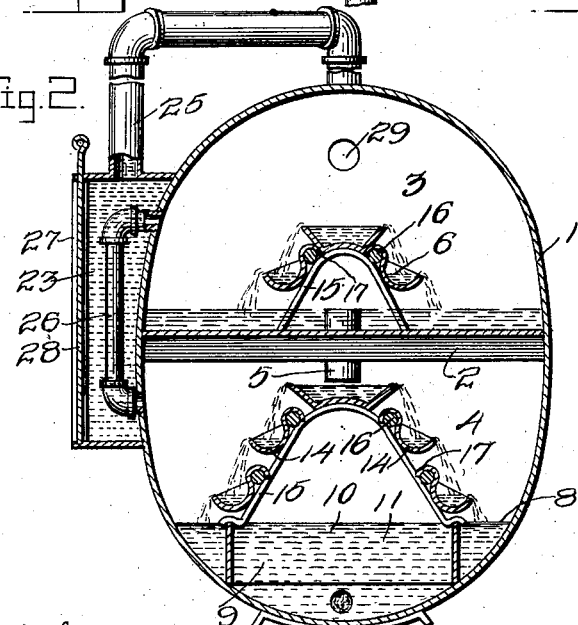

In the accompanying drawings, Figure 1 is a vertical longitudinal sectional view of a feed-water heater and purifier constructed in accordance with my invention. Fig. 2 is a vertical transverse sectional view of the same, taken on the plane indicated by the line *a a* of Fig. 1.

In the embodiment of my invention I provide a casing 1, which is here shown as elliptical in cross-section, but which may be of any suitable form, size, and construction. The same is divided by a longitudinal partition-plate 2 into an upper compartment 3 and a lower compartment 4. The longitudinal partition-plate forms the bottom of the upper compartment, and the same is inclined downwardly from its ends to its center and provided at its center, which is its lowest level, with an overflow-pipe 5, the said pipe rising for a suitable distance above the lower portion of the said partition-plate and being open at its upper and lower ends. The said partition-plate or bottom of the upper compartment and the said overflow-pipe constitute a trap which is efficient in causing a quantity of water to accumulate in the bottom of the upper compartment before it can flow therefrom into the lower compartment. This trap retards the flow of the water from the upper compartment to the lower compartment and causes the impurities in the water to be precipitated to the bottom 2, the water being drawn from near the level of the water at an elevated point by the overflow-pipe 5 and discharged thereby from the upper compartment into the lower compartment. In the upper compartment is a plurality of precipitate-troughs 6, which are longitudinally disposed and are also disposed at different elevations, one below another and adjacent to each other, so that water supplied to the uppermost trough will flow therefrom into each of the lower troughs in succession.

In the lower portion of the lower compartment 4, at one end thereof, is a filtering-chamber 8. The same is in practice filled with sand, gravel, charcoal, or any other suitable filtering material. That portion of the bottom of the lower compartment which is not occupied by the filtering-chamber 8 is covered by a grate-trap 9, which is a bottomless tray comprising a plurality of bottomless compartments 10, separated from each other by partition-plates 11, which connect the sides of the tray. The latter is removable from the lower compartment, and the precipitate-troughs 6, hereinbefore described, are also removable from the upper compartment. The said compartments are each provided at one end with a manhole 12 and with a head-plate 13 to form a closure therefor. The plates are secured on the open ends of the said compartments by any suitable means.

In the lower compartment 4 on the grate-trap 9 are disposed a plurality of precipitate-troughs 14. The same are substantially identical in construction with the precipitate-troughs 6. All of the precipitate-troughs are supported by stands 15, having longitudinal side bars 16, and each of the lower precipitate-troughs is provided at its inner side with a hook 17 to engage one of said bars, and hence each of the precipitate-troughs, except the uppermost, is removable from the stands 15 at will. This construction enables either series of the precipitate-troughs to be removed either collectively or singly, as may be desired.

It will be understood from the foregoing that by this construction of the casing, the grate-trap, and the precipitate-troughs access may be readily attained to either compartment of the casing and to either or all of the precipitate-troughs and also to the grate-trap, so that the same may be readily cleansed when it becomes necessary.

On one end of the casing in proximity to the filter-chamber 8 is a supplemental filter-chamber 17. Communication is established between the said filter-chambers, as at 19, and preferably the exterior filter-chamber 17 is provided with a water-gage 20 and with a draw-off faucet 21, by which it may be drained. The same is also provided with a water-discharge connection 22, by which water after the same has been heated and purified in the heater and purifier may be supplied to the pump or boiler.

On one side of the casing, and preferably near that end thereof which is provided with manholes, is a condensing-chamber 23. A feed-water pipe 24 is coupled thereto near its lower side, and a pipe 25 leads from the upper end of said condensing-chamber and discharges into the upper side of the upper compartment 2, directly above the uppermost precipitate-trough 6 therein. A pipe 26, which is disposed in the condensing-chamber 23, establishes communication between the steam-spaces of the upper and lower compartments, this pipe allowing steam to pass from the upper compartment to the lower, as will be understood. The condensing-chamber 23 is here shown as provided in one side with an opening 27 and a closure 28 therefor, whereby access may be obtained to the interior of the said condensing-chamber to enable the same to be readily cleaned.

Exhaust-steam from the engine is introduced into the upper compartment through the connection 29 and passes from the upper compartment to the lower compartment through the pipe 26 in the condenser 23. The lower compartment is provided with a discharge connection 30 for the exhaust-steam. It will be understood that the water in the condenser 23 serves to condense the steam as it passes through the pipe 26 and that the feed-water which enters the upper compartment through the pipe 25 is discharged onto the uppermost pricipitate-trough 6, first fills the same, then overflows into the lower precipitate-trough 6, then passes into the trap forming the bottom of the upper compartment, then passes through the pipe 5 into the lower compartment, being caught first by the uppermost precipitate-trough 14, caused to fill each of said troughs in succession, then to pass into the lower portion of the lower compartment, from thence through the filter-chamber 8, and finally through the supplemental filter-chamber 17 before it is fed to the boiler. The impurities are caused to settle in the said precipitate-troughs and in the bottoms of the upper and lower compartments, so that the water is effectually ridden thereof. Such impurities as fail to be thus precipitated are arrested in the filter-chambers, so that the water is entirely purified before it is supplied to the boiler. It will be understood that the feed-water during its passage through the apparatus is effectually heated by the exhaust-steam, the course of which has been hereinbefore indicated.

From the foregoing description, taken in connection with the accompanying drawings, the construction, operation, and advantages of my invention will be readily apparent, it is thought, without requiring a more extended explanation.

Various changes in the form, proportion, and the minor details of construction may be resorted to without departing from the principle or sacrificing any of the advantages of this invention.

Having thus fully described my invention, what I claim as new, and desire to protect by Letters Patent, is—

1. A feed-water heater having a plurality of communicating compartments, means to supply exhaust-steam to one of said compartments, a conduit to establish steam communication between the said compartments, and means to supply feed-water to one of said compartments, the said feed-water-supplying means including a condenser in which the steam-conduit between the compartments is disposed, whereby the feed-water is employed to condense the steam as the latter passes from one compartment to another, substantially as described.

2. A feed-water heater having an upper compartment and a lower compartment, said upper compartment having an overflow-trap in its lower side, discharging into the lower compartment, means to supply steam to the upper compartment, a condenser having means to supply feed-water thereto, and means to conduct feed-water therefrom to the upper compartment, and a conduit to establish steam communication between the upper and lower compartments, said conduit passing through said condenser, substantially as described.

3. A feed-water heater having an upper compartment, the bottom of which forms an overflow-trap, a lower compartment fed with water by said trap, means to supply the upper compartment with steam, means to establish steam communication between the upper and lower compartments, and a filter in the latter through which the water passes as it is discharged therefrom, substantially as described.

In testimony whereof I have hereunto set my hand in presence of two subscribing witnesses.

ROBERT WILLIAM JONES.

Witnesses:
   JEANNETTE VAN WAGENER,
   FRED VAN WAGENER.